United States Patent [19]

Cross

[11] 4,148,400
[45] Apr. 10, 1979

[54] PALLET LOCATOR AND CLAMPING ASSEMBLY

[75] Inventor: Ralph E. Cross, Grosse Pointe Shores, Mich.

[73] Assignee: The Cross Company, Fraser, Mich.

[21] Appl. No.: 774,897

[22] Filed: Mar. 7, 1977

[51] Int. Cl.$^2$ .............................................. B65G 25/04
[52] U.S. Cl. .................................... 414/750; 198/339; 198/345; 198/472; 198/648; 198/740; 198/774; 414/332
[58] Field of Search ............. 214/1 BB, 309; 198/339, 198/345, 472, 648, 740, 774; 269/56; 294/81 R, 103, 815 F, 65

[56] References Cited

U.S. PATENT DOCUMENTS

| | | | |
|---|---|---|---|
| 2,842,037 | 7/1958 | Gobeille | 294/65 X |
| 3,155,217 | 11/1964 | Cross | 198/345 |
| 3,213,996 | 10/1965 | Tech | 198/472 X |
| 3,658,197 | 4/1972 | Donato | 294/81 R X |
| 3,771,669 | 11/1973 | Maggioni | 214/1 BB |
| 3,888,341 | 6/1975 | Konkal | 198/345 |

Primary Examiner—Francis S. Husar
Assistant Examiner—George F. Abraham
Attorney, Agent, or Firm—Harness, Dickey & Pierce

[57] ABSTRACT

There is disclosed herein improved pallet locating and clamping mechanisms for use in conjunction with the work transfer device in a transfer machine. The pallet locating and clamping means comprise a plurality of inverted V-blocks accurately positioned in the work stations of the machine which are adapted to cooperate with complementary V-grooves provided in the undersides of the pallets for automatically positioning and supporting such pallets precisely in the work stations preparatory to machining or other work operations to be performed on workpieces carried by the pallets. The clamping means for the pallets preferably are mechanically actuated and correlated with the pallet transfer device to clamp the pallets securely on the locating and supporting V-blocks.

20 Claims, 8 Drawing Figures

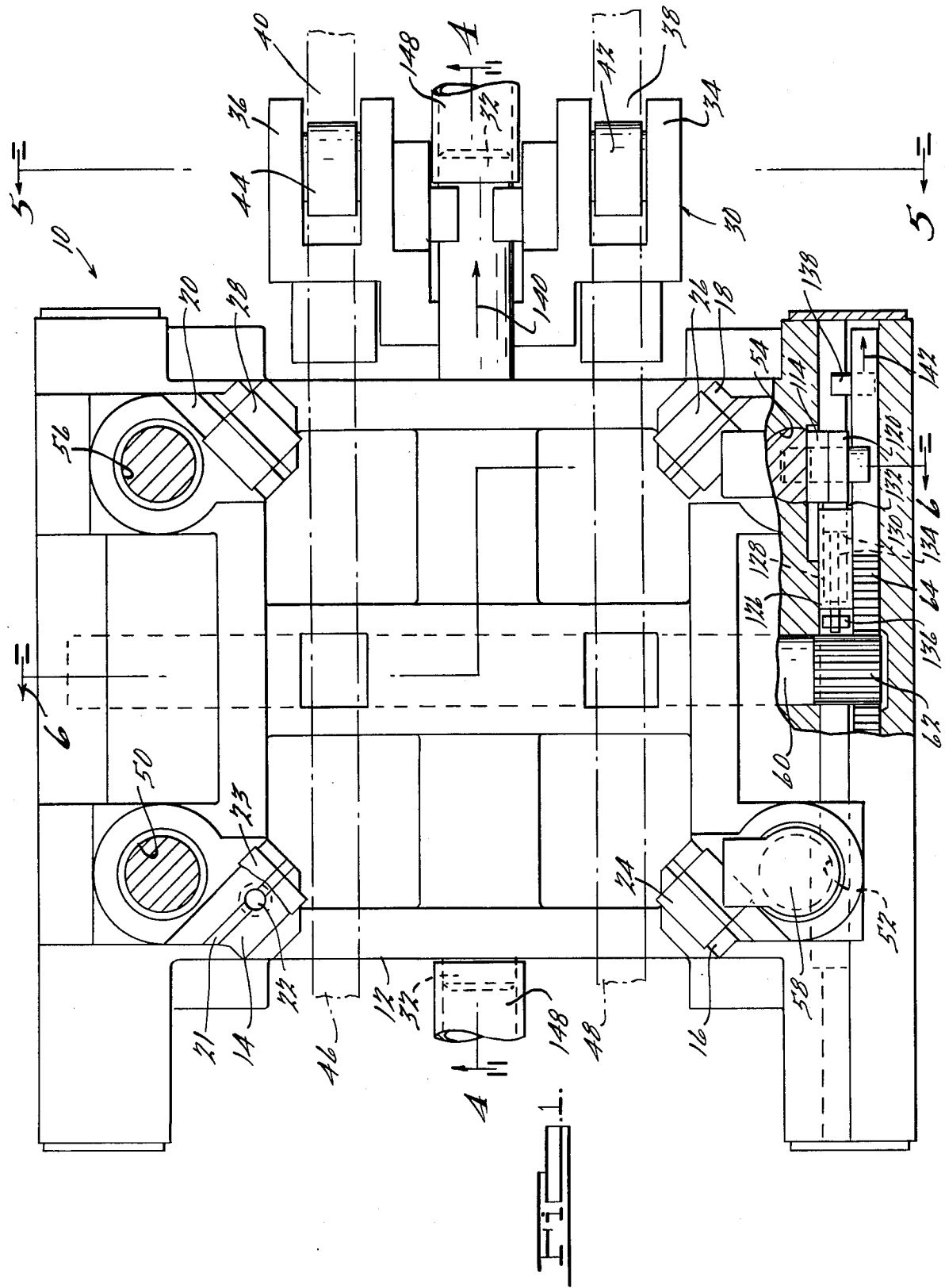

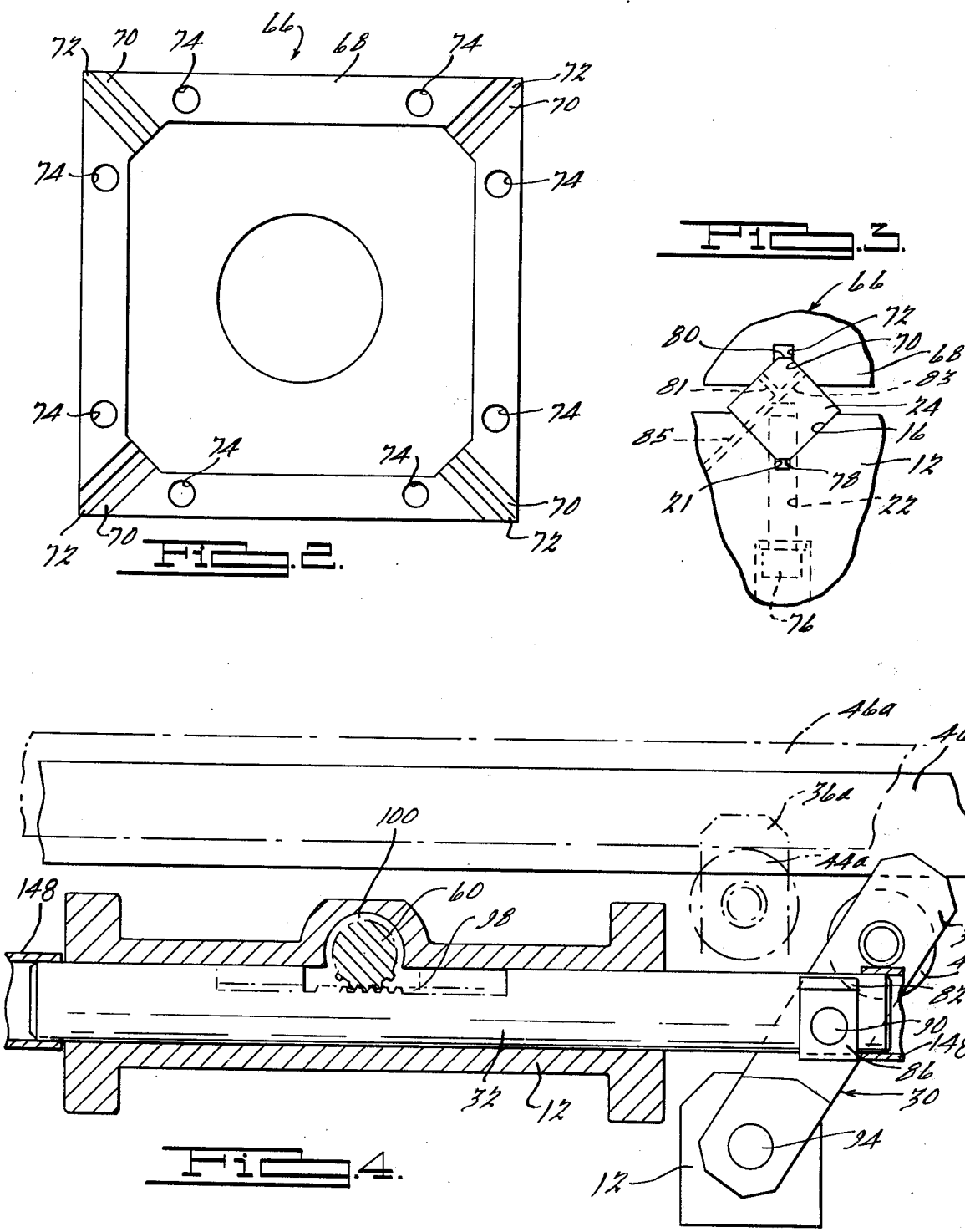

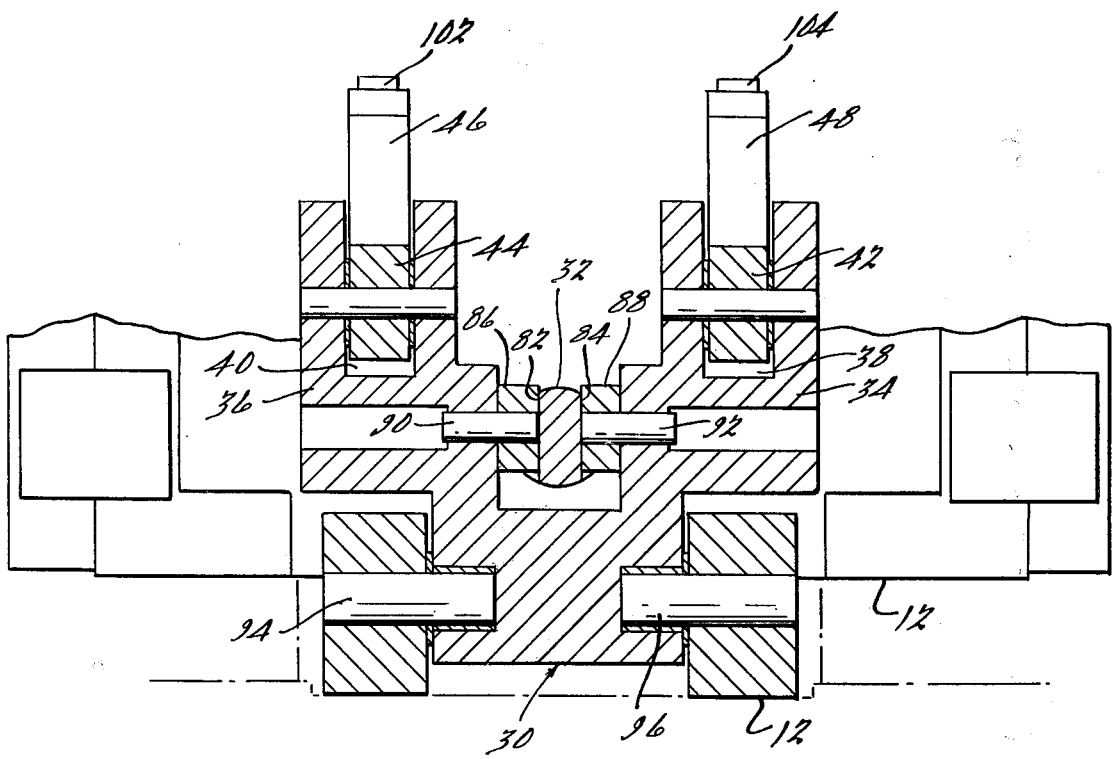
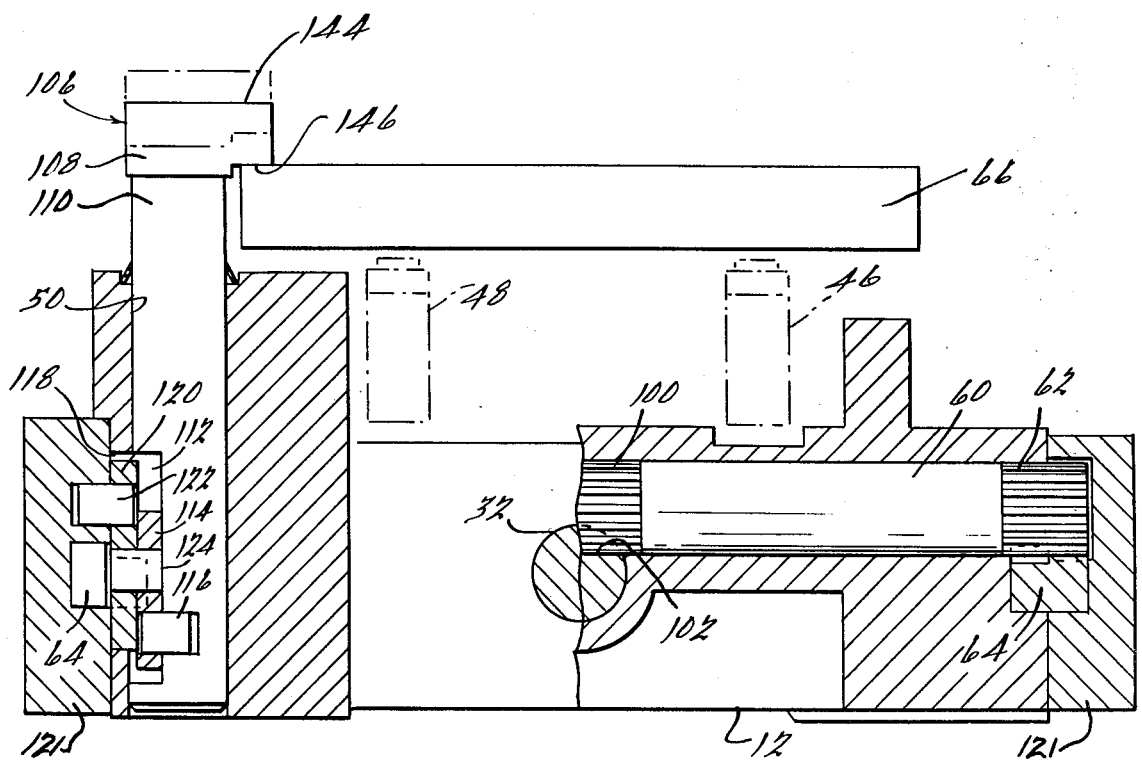

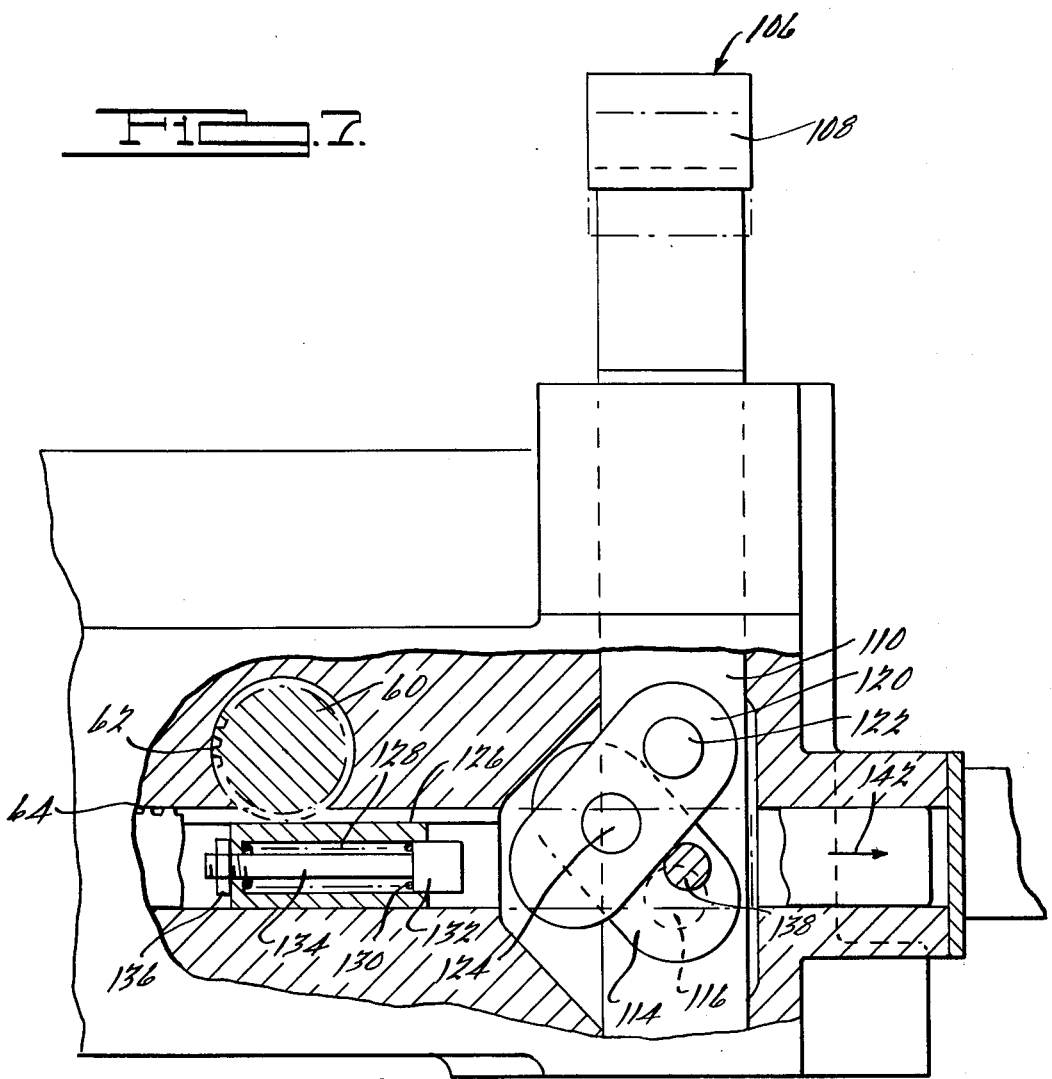

PALLET LOCATOR AND CLAMPING ASSEMBLY

BACKGROUND AND SUMMARY OF THE INVENTION

The present invention is used in association with work transfer devices which transfer workpieces carried on pallets progressively from station to station in a transfer machine and more particularly to improved pallet locating and clamping mechanisms for use in conjunction with the transfer device.

In a typical automated transfer machine, workpieces are mounted securely on individual pallets which are moved progressively in unison from one work station to another. Each work station is equipped with means for positioning or locating a pallet accurately that has been transferred into the station and for clamping the located pallet securely in the located position. Tool heads on the work stations then advance, perform their respective operations on the workpiece, and then retract preparatory to the next operating cycle of the machine. In practice, after the tool heads have retracted, the clamps are released and transfer bars are engaged with the pallets to lift the latter off the positioning or supporting means and then moved to advance the pallets to the next work station where they are again lowered onto positioning and supporting means and clamped and other machining operations are performed on the workpieces.

The machine operations performed on these workpieces may involve milling, drilling or a variety of other operations all of which require that each workpiece not only be securely held in position during the operation so as to avoid tool breakage but also that successive workpieces be positioned in exactly the same location within the work station so as to insure that the machining operation is accurately performed on the workpiece. Further, as such work transfer machines are generally employed in high volume production lines and may be substantially automatic in operation few, if any, of the work stations will be operator attended. It is therefore extremely important that the locating and clamping mechanisms be extremely reliable in operation. Further, it is also desirable to minimize the moving parts and generally simplify the overall construction of such transfer machines so as to reduce the required maintenance and repair as well as to reduce downtime required to accomplish the maintenance and/or repair. Also, as such work transfer equipment is often subject to extreme adverse environmental operating conditions, it is desirable to avoid complex control equipment as much as possible in the interests of improving reliability as well as reducing the complexity and time required for repairs should an equipment failure be encountered.

Accordingly, the present invention provides an economical and efficient work transfer machine having extremely durable passive locating means and positively acting, mechanically actuated and correlated clamping mechanisms which minimizes the need for auxiliary control equipment while insuring a positively acting, durable and reliable machine requiring a minimum of maintenance. The work transfer machine of the present invention may include any desired number of work stations each of which will include pallet locator and clamping means as well as means for raising and lowering workpiece carrying pallets into position thereon. The pallet locator means includes a plurality of V-blocks secured in position on a supporting base each of which cooperates with mating grooves provided on the pallets to position the workpiece precisely with respect to the tool head as the pallet is lowered into the work station. Clamping members are disposed along two sides of the pallet and are mechanically actuated by and sequence correlated with the pallet transfer mechanism which raises and lowers the pallets into and out of engagement with the locators. The mechanical linkage is designed so as to insure that the pallets has been fully lowered prior to engagement of the clamping members with the pallet as well as to insure that the clamping members are released prior to the raising of the pallet for transfer to the next successive work station. The use of this directly coupled, mechanically actuated clamping mechanism eliminates the need for complex and costly control mechanisms and insures a reliable sequence correlation between pallet movements and engagement of the clamping members. Further, the use of the V-blocks and mating grooves on the pallet provides an economical, reliable, and durable means for locating the pallets which require no moving parts. Also, as the V-blocks provide a relatively large surface area of engagement with the pallets all of which actively assists in locating the pallets, the problems of misalignment of the workpieces caused by wear of the locating mechanism is effectively minimized.

Additional advantages and features of the present invention will become apparent from the following description of the preferred embodiment taken in conjunction with the drawings and appended claims.

BRIEF DESCRIPTION OF THE DRAWINGS

FIG. 1 is a top plan view of a work station in a transfer machine and showing pallet locating means embodying the present invention associated with pallet clamping means and a portion of the pallet transfer device, parts being broken away and shown in section to illustrate operating parts of the mechanisms;

FIG. 2 is a bottom plan view of a pallet for use in conjunction with the pallet locators shown in FIG. 1;

FIG. 3 is an enlarged, fragmentary, side elevational view of the work station shown in FIG. 1 and particularly illustrating the pallet locating means in operative relationship with the pallet of FIG. 2;

FIG. 4 is a longitudinal, vertical sectional view taken on the line 4—4 of FIG. 1 and particularly illustrating the pallet lift mechanism of the transfer device;

FIG. 5 is a transverse, vertical sectional view taken on the line 5—5 of FIG. 1;

FIG. 6 is a transverse, vertical sectional view taken on the line 6—6 of FIG. 1;

FIG. 7 is an enlarged side elevational view of the work station with parts broken away to show the actuating mechanism for the pallet clamps, the latter being illustrated in the released position; and FIG. 8 is a view similar to FIG. 7 but illustrating the pallet clamp and its associated actuating mechanism in the clamped position.

DESCRIPTION OF THE PREFERRED EMBODIMENT

Referring now to FIG. 1, th numeral 10 designates a single representative work station of a transfer machine embodying the novel features and construction of the present invention. It should be noted that, while only a single work station is illustrated in FIG. 1, a typical transfer machine has a plurality of work stations and may also include several idle stations arranged in line along the length thereof with various work performing apparatus disposed at the work stations therealong. The specific number of such stations will depend upon the number of particular operations to be performed upon a particular workpiece.

The work station 10 has a base 12 which forms a support and enclosure for the pallet locating and clamping mechanisms. Four generally V-shaped, upwardly opening, diagonally extending grooves 14, 16, 18 and 20 are formed in the top of the base 12 at the corners thereof. V-groove 14 has a small relief groove 21, and an aperture 22 is provided in the bottom of the groove 21 which accommodates a bolt such as the one shown at 76 in FIG. 3 for securing a V-block 23 therein. V-grooves 16, 18 and 20 also have relief grooves 21 and apertures 22 for the same purpose. V-blocks 23, 24, 26 and 28 are shaped to substantially correspond to the configuration of the V-grooves 14, 16, 18 and 20. This relationship will be described in greater detail with reference to FIG. 3.

The base 16 also has a vertical actuator for raising and lowering the transfer bars 46 and 48 into and out of engagement with a pallet supported on the V-blocks which comprise a rocker arm 30 pivotally attached to the base member 12 below a centrally disposed longitudinally extending shaft 32. The rocker arm 30 has a pair of spaced-apart substantially parallel outwardly extending arms 34 and 36, each of which has a relatively deep slot 38 and 40, respectively, provided therein. A pair of supporting rollers 42 and 44 are rotatably mounted within respective slots 38 and 40. The shaft 32 has one end thereof in pivotable and slidable engagement with the rocker arm 30 and is adapted to pivot the rocker arm 30 to raise and lower a pair of spaced-apart transfer bars 46 and 48 (shown in phantom in FIG. 1) which move a pallet vertically into and out of engagement with the locating blocks 23, 24, 26 and 28. The rocker arm 30 and its operation will be described in greater detail below with reference to FIGS. 4 and 5.

The base member 12 also has four vertically extending bores 50, 52, 54 and 56 each of which preferably is disposed adjacent one of the V-blocks 23-28. A clamping member 58 is shown slidably disposed within the bore 52 and when the work station 10 is in operation, the bores 50, 54 and 56 also have substantially identical clamping members slidably disposed therein.

A transverse shaft 60 is journaled within base member 12 approximately midway between the longitudinal ends of work station 10 and is adapted to be rotatably driven by shaft 32 as described in greater detail below. Transverse shaft 60 has a pinion gear 62 provided on an end portion thereof which engages a rack 64 longitudinally slidably disposed within base member 12. Rack 64 is adapted to engage toggles secured between base member 12, cover member 121 and clamp member 58 so as to raise and lower the clamp members as described in greater detail below.

A pallet adapted for use with transfer machine 10 is illustrated as seen from the bottom side in FIG. 2 and indicated generally at 66. Pallet 66, as shown therein, is square in shape and has a depending peripheral flange portion 68. Four diagonally extending generally V-shaped grooves 70 are provided in the flange portion 68 at the corners of the pallet 66. Each of these V-shaped grooves has a small rectangular relief groove 72 provided at the bottom thereof. A plurality of holes 74 are also provided in flange portion 68, disposed one on either side of each of the V-shaped grooves. Holes 74 are of a rather large diameter, extend only a short distance into flange portion 68 and are adapted to receive upwardly projecting pins provided on the transfer bars to prevent relative movement of the pallet with respect to the transfer bars during transfer of the pallet between work stations. It should be noted that while pallet 66 is illustrated as being generally square in shape, it may be of any desired shape suitable to accommodate the desired workpiece. Further, it may be desirable to provide additional V-grooves along flange portion 68 thereof should the size of the pallet and weight of the workpiece require additional support and/or locating assistance.

The operative relationship of V-block 24 and V-groove 70 is best seen with reference to FIG. 3 in which there is shown a portion of a base 12 containing a V-groove 16 with a V-block 24 securely fastened therein by fastener 76 extending upwardly through hole 22 and threadingly engaging block 24. As illustrated therein, V-block 24 has a pair of generally horizontal flat surfaces 78 and 80 at the upper and lower diagonally disposed corners thereof which cooperate with relief grooves 21 and 72 to insure against debris causing pallet 66 to be inaccurately located thereon. Each of the other three diagonally disposed V-blocks cooperates with respective V-grooves 70 provided in pallet 66 in an identical manner to accurately locate the workpiece longitudinally, transversely and vertically within the work station.

In some machining operatins which may be performed on the workpiece, metal chips, shavings or the like may be produced which could fall onto the pallet engaging and locating surfaces of the V-blocks during transfer of the pallets and result in inaccurate positioning of successive pallets thereon. Accordingly, should it be desirable, V-block 24 may be provided with air passages 81 and 83 communicating with air passage 85 in support 12 and an air supply which will allow an air blast to be applied to the locating surfaces to remove any such debris. The other V-blocks 23, 26 and 28 may be provided with an air supply in an identical manner.

The vertical actuator is illustrated and will be described in detail with reference to FIGS. 4 and 5. As shown therein, longitudinal shaft 32 is slidably journaled within the base 12 and has a pair of slots 82 and 84 provided on opposite sides thereof adjacent one end in which blocks 86 and 88 respectively are slidably disposed. The blocks 86 and 88 are pivotally pinned within the slots 82 and 84 on rocker arm 30 by pins 90 and 92 respectively. The rocker arm 30 is also pivotally pinned to the base 12 by pins 94 and 96 at a point below the point of attachment to shaft 32. The shaft 32 also has a rack 98 provided on a mid-portion thereof which engages a pinion portion 100 of transverse shaft 60 which is also rotatably journaled within base 12 immediately above shaft 32. As longitudinal shaft 32 is caused to slide to the left with respect to base member 12 as seen in FIG. 4, rack 98 will impart a clockwise rotation to pinion 100 and transverse shaft 60. The shaft 32 will also cause the supporting rollers 42 and 44, rotatably mounted on the arms 34 and 36 of the rocker arm 30, to move upwardly in a counterclockwise direction from the full line position to the broken line position illustrated in FIG. 4. This motion along with the identical and simultaneous motion of other vertical actuators located at each station of the transfer machine causes transfer bars 46 and 48 which extend the entire length of the transfer machine to move upwardly into engagement with a pallet located in the work station and to raise the pallet off the supporting and locating V-blocks. As seen in FIG. 5, transfer bar 46 is provided with an upwardly extending projection 102 which cooperates with holes 74 to prevent movement of pallet 66 with respect to transfer bar 46 during the transfer operation. Similarly, transfer bar 48 is also provided with projection 104 for engaging another hole 74 on pallet 66. Additional projections are provided on both transfer bars 46 and 48 in a spaced-apart arrangement and will typically be arranged so that two of such projections on each transfer bar engage each pallet during the transfer operation.

The pallet clamps and associated actuating mechanism are best seen and will be described in detail with reference to FIGS. 6, 7, and 8. A clamp 106 is shown in FIG. 6 in an operative relationship to pallet 66 with transfer bars 46 and 48 shown in a fully lowered position. The clamp 106 includes a head portion 108 and a generally cylindrical lower shank portion 110 slidably disposed within bore 50 provided in base 12. A notched portion 112 is provided in lower shank portion 110 adjacent the lower end thereof. A toggle arm 114 is pivotally secured to shank portion 110 by pin 116 near the lower end of notched portion 112. The base 12 is also provided with a notched portion 118 which communicates with notch 112 and in which is disposed a second toggle arm 120 pivotally secured to a cover member 121 by a pin 122. Cover member 121 overlies and is secured to base 12 in any convenient manner such as by a plurality of bolts which enable it to be easily removed to afford access to the clamp actuating mechanism. The toggle arms 114 and 120 overlap and are pivotally attached to each other by a pin 124.

As best seen in FIG. 1, rack 64 is provided with a laterally inwardly protruding member 126 which has a longitudinal bore 128 opening outwardly at one end toward toggle arms 114 and 120 within which is disposed a helical coil spring 130 biasing a plunger 132 outwardly from bore 128. Plunger 132 is adapted to be slidably received within bore 128 and has a rod portion 134 extending coaxially through spring 130 and out the opposite end of extension 126. A stop means 136 is provided on the outer portion of rod 134 so as to prevent spring 130 from ejecting plunger 132 from bore 128. Stop means 136 will preferably be in the form of a nut threadingly engaging the outer end portion of rod 134. A laterally inwardly extending pin 138 is also secured to rack 64 adjacent its outer terminal end.

When a pallet has been moved into position by transfer bars 46 and 48, a power source will cause shaft 32 to move in the direction of arrow 140 of FIG. 1 which in turn causes rocker arm 30 to lower pallet 66 into position on the four diagonally disposed V-blocks 23, 24, 26 and 28. Rocker arm 30 will continue to lower transfer bars 46 and 48 below and out of engagement with pallet 66 to prevent any possible interference with the positioning of pallet 66 on the V-blocks 23, 24, 26 and 28. The longitudinal movement of shaft 32 will also impart a counterclockwise rotation to transverse shaft 60 through the cooperation of rack 98 and pinion 100. Pinion 26 on shaft 60 will then cause rack 64 to move in the direction of arrow 142 of FIGS. 1, 7 and 8 thereby moving plunger 132 into engagement with toggle arms 114 and 120. As rack 64 continues its longitudinal movement, plunger 132 will cause toggle arms 114 and 120 to pivot about pins 116, 122 and 124 thereby moving clamp 106 vertically downward with respect to base 12 and bringing head portion 108 into clamping relationship with pallet 66 as best seen in FIG. 8. Any over-travel of rack 64 will be absorbed by the retraction of plunger 132 into bore 128 compressing the helical compression spring 130. This slight over-travel will insure that slight variations between pallets will not result in an insecure clamping action. It should also be noted that the travel distance for rack 64 and clamp 106 will be designed to insure that rocker arm 30 has fully lowered pallet 66 onto V-blocks 23, 24 26 and 28 prior to the engagement of clamp 106 therewith. Rack 64 has an identical clamp actuation assembly provided adjacent its opposite end for actuating clamp 58. Also, transverse shaft 62 has an identical pinion provided on its opposite end which actuates two additional clamps disposed in holes 50 and 56 through an identical rack and toggle arms associated therewith in an identical manner and simultaneously with the actuation of clamps 106 and 58. Thus, once pallet 66 having a workpiece securely mounted thereon has been transferred into the work station and lowered into position on the V-blocks, the clamps will securely retain the pallet in position during the performance of the intended operation on the workpiece.

As best seen in FIGS. 1 and 6, head portion 108 of clamp 106 has a laterally inwardly extending generally rectangular-shaped portion 144 having a width substantially equal to or slightly greater than the width of head portion 108 the bottom edge of which is provided with a shallow notch 146. The rectangular portion 144 is disposed so as to overlay the edge of pallet 66 and provides a full face surface engagement therewith so as to insure that a maximum clamping force is exerted on the pallet member.

It should also be noted that the clamp 106 is preferably positioned immediately adjacent to V-block 23 so as to position head portion 108 in a partially overlying relationship to the V-block 23. This positioning allows V-block 23 to directly oppose at least a portion of the force exerted by the clamp 106 thereby insuring that these clamping forces will not cause distortion of pallet 66. Each of the other three clamps are identical to clamp 106 and are similarly positioned relative to respective V-blocks 24, 26 108 and 28, and further description thereof is believed unnecessary.

Once the work operation has been completed, a power source will be actuated causing shaft 32 to move longitudinally in a direction opposite that indicated by arrow 140 thereby causing the rocker arm 30 to raise transfer bars 46 and 48 and simultaneously to rotate the transverse shaft 60 in a clockwise direction to move rack 64 in a direction opposite that indicated by arrow 142. As the rack 64 retracts, pin 138 mounted thereon will move into engagement with toggle arms 114 and 120 thereby causing them to release and raise clamp 106 out of engagement with pallet 66. As transfer bars 46 and 48 are spaced below pallet 66 during the performance of the work operation and in that only a short travel distance is required to bring pin 138 into engagement with toggle arms 114 and 120, this mechanical linkage arrangement will insure that the clamps have been released prior to the engagement of transfer bars 46 and 48 will pallet 66.

As rocker arm 30 raises transfer bars 46 and 48 into engagement with pallet 66, projections 102 and 104 will enter respective holes 74 provided on pallet 66 so as to prevent movement therebetween. The transfer bars will then raise pallet 66 up from V-blocks 23, 24, 26 and 28 in preparation for advancement to the next successive work station. A power source will then advance transfer bars 46 and 48 along supporting rollers 42 and 44 thereby moving pallet 66 and its associated workpiece into the next work station and the entire cycle is repeated with the transfer bars being retracted to their original position once the pallets have been lowered into the next work station.

In a typical installation, a plurality of work stations will be arranged end to end with a loading station provided at one end in which a new workpiece and pallet will be positioned and an unloading station provided at the opposite end for removal of the completed workpiece. The transfer bars will typically extend the entire length of the multi-station transfer machine. Further, if desired, a single power source for the longitudinal shafts 32 may be provided at one end and the adjacent ends thereof of successive stations mechanically coupled together such as by coupler 148 of FIG. 1. Alternatively, the ends of shafts 32 may be merely butted together and separate power sources provided at opposite ends or at intermediate locations as along the transfer machine. In either event, it is apparent that the transfer machine of the present invention provides a totally mechanical linkage arrangement which minimizes the need for auxiliary controls and requires only one or two power sources at most. Further, as substantially no electrical or electronic control mechanisms are required in the present invention, less highly skilled maintenance personnel will be required and any required adjustments and/or repairs may be made more quickly and easily thereby reducing both maintenance costs and machine downtime. Also, the use of direct mechanical linkage insures positive and simultaneous actuation of the entire transfer machine.

While it will be apparent that the preferred embodiment of the invention disclosed herein is well calculated to provide the advantages above set forth, it will be appreciated that the invention is susceptible to modification, variation and change without departing from the fair meaning or proper scope of the subjoined claims.

I claim:

1. A locating and clamping mechanism for use in combination with a work transfer machine comprising,
   a supporting base,
   mechanism including a longitudinally extending shaft slidably journaled in said base for moving a work carrying pallet vertically onto and from said base,
   a plurality of V-blocks secured to said base and adapted to recieve said pallet so as to longitudinally and transversely position said pallet with respect to said base and to support said pellet thereon,
   a rack provided on said longitudinal shaft,
   a transverse shaft rotatably journaled within said base,
   a first pinion centrally disposed on said transverse shaft and engaging said rack on said longitudinal shaft so as to cause rotation of said transverse shaft in response to sliding motion of said longitudinal shaft,
   second and third pinions disposed on opposite ends of said transverse shaft,
   first and second longitudinal racks slidably mounted on opposite sides of said base and engaging respective of said second and third pinions so as to cause a sliding movement thereof in response to rotation of said transverse shaft,
   first and second pairs of clamping members slidably journaled within said base for vertical movement adjacent the inner sides of respective first and second longitudinal racks,
   each of said clamping members having a first toggle arm pivotally secured to said clamping members, a second toggle arm pivotally secured to said base, said first and second toggle arms being pivotally interconnected,
   first and second members near opposite ends of each of said first and second racks, each of said members having a longitudinally extending bore therein, a plunger slidably disposed within said bore and means urging said plunger out of said bore,
   each of said plungers being so positioned as to engage said toggle arms in response to sliding movement of said first and second racks in a first direction to cause said clamping members to move into clamping engagement with said pallet, and
   projections adjacent opposite ends of each of said racks adapted to engage said toggle arms in response to movement of said racks in a second direction to cause said clamping members to move out of engagement with said pallet.

2. A locating and clamping mechanism as set forth in claim 1 wherein said first and second pairs of clamps have at least a portion thereof overlying respective ones of said plurality of V-blocks.

3. A transfer machine of the type having:
   work stations,
   work carrying pallets,
   work performing means in said stations for performing operations on work carried by said pallets; and
   a transfer device for moving said pallets progressively from station to station in the machine operative to lower the pallets into the stations,
   said stations and said pallets having cooperative mating and mutually interengageable top and bottom parts, respectively,
   the top part of each station having a plurality of fixed, stationary, beveled supporting and locating surfaces disposed at opposite sides and at opposite ends of said station and defined by V-blocks extending diagonally of said station, and the bottom part of each pallet having a plurality of seating surfaces each disposed to rest upon a respective one of said supporting and locating surfaces when the pallet is lowered into said station,
   said locating surfaces collectively adapted to carry the full weight of the pallet when the latter is in fully lowered position and being arranged angularly with respect to each other so that each locating surface in each station acts in opposition to a plurality of other locating surfaces in said station to adjust the pallet in the station longitudinally and transversely of the machine as the seating surfaces of the pallet come to rest thereon and to position work on the pallet precisely longitudinally, transversely and vertically with respect to said work performing means.

4. The combination as set forth in claim 3 wherein in each of said pallets the seating surfaces are defined by V-grooves in the underside of said pallet.

5. A transfer machine of the type having work stations, work carrying pallets, work performing means in said stations for performing operations on work carried by said pallets, and a transfer device for moving said pallets progressively from station to station in the machine operative to lower the pallets into the stations;

said stations and said pallets having cooperative mating and mutually interengageable top and bottom parts, respectively, the top part of each station having a plurality of fixed, stationary, beveled supporting and locating surfaces, and the bottom part of each pallet having a plurality of seating surfaces each disposed to rest upon a respective one of said supporting and locating surfaces when the pallet is lowered into said station, said locating surfaces collectively adapted to carry the full weight of the pallet when the latter is in fully lowered position and being arranged angularly with respect to each other so that each locating surface in each station acts in opposition to a plurality of other locating surfaces in said station to adjust the pallet in the station longitudinally and transversely of the machine as the seating surfaces of the pallet come to rest thereon and to position work on the pallet precisely longitudinally, transversely and vertically with respect to said work performing means;

clamps in each work station engageable with a pallet in said station to hold the same securely on and pressed solidly against the supporting and locating surfaces of said station, and wherein said transfer device includes pivoted lift arms for raising and lowering a pallet in said station, toggle actuators for said clamps, a reciprocable common mechanical actuator for said transfer device and said clamps, means connecting said common mechanical actuator to said lift arms operative during a first increment of motion thereof in one direction to actuate said lift arms to lower said pallet in said station and onto said supporting and locating surfaces, and drive means for transferring motion from said common mechanical actuator to said clamps including spring operated actuator means adjacent to said toggle actuators, said drive means being operative to bring said spring operated actuator means into operative engagement with said toggle actuators during said first increment of motion of said common mechanical actuator and operative during a second increment of motion of said common mechanical actuator to move said clamps into clamping engagement with said pallet through said spring operated actuator means.

6. The combination as set forth in claim 5 wherein said clamps are positioned within each work station so as to have at least a portion thereof overlying said beveled supporting and locating surfaces.

7. In a transfer machine,
a work station having fixed stationary supports,
a work carrying pallet adapted to rest on said supports,
movable pallet clamps in said work stations;
toggle actuators for said clamps;
a transfer device for moving said pallet into and out of said work station including pivoted lift arms for lowering and raising the pallet in said station onto and off of said supports;
a reciprocable common mechanical actuator for said transfer device and said clamps;
a first drive means connecting said common mechanical actuator to said lift arms operative during a first increment of motion of said actuator in one direction to actuate said lift arms to lower said pallet in said station and onto said supports, said supports and said pallet having mutually engageable cam surfaces operative under the weight of said pallet as the latter is lowered in said station to locate the latter precisely in said station; and second drive means for transferring motion from said common mechanical actuator to said clamps including spring operated actuator means adjacent to said toggle actuators, said second drive means being operative to bring said spring operated actuator means into operative engagement with said toggle actuators during said first increment of motion of said common mechanical actuator and operative during a second increment of motion of said common mechanical actuator in the mentioned direction to move said clamps into clamping engagement with said pallet through said spring operated actuator means, whereby to hold the pallet on said supports with said cam surfaces pressed solidly together, said second drive means being further operable by a first increment of motion of said common mechanical actuator in the opposite direction to disengage said clamps from said pallet and said first drive means being operable by a second increment of motion of said common mechanical actuator in said opposite direction to actuate said lift arms to raise said pallet off of said supports.

8. In a pallet transfer machine of the type having a plurality of work stations each provided with
movable clamps engageable with a pallet in said station to hold the same,
toggle actuators for moving said clamps into and out of engagement with said pallets,
a transfer device for moving pallets progressively from station to station in the machine,
a reciprocable common mechanical actuator for said transfer device and said clamps,
means connecting said common mechanical actuator to said transfer device operative during an increment of motion thereof in one direction to complete the movement of pallets into said stations, and
drive means for transferring motion from said common mechanical actuator to said clamps including spring operated actuator means adjacent to said toggle actuators,
said drive means being operative to bring said spring operated actuator means into operative engagement with said toggle actuators during said mentioned increment of motion of said common mechanical actuator and operative during a subsequent increment of motion of said common mechanical actuator in said mentioned direction to move said clamps into clamping engagement with said pallet through said spring operated actuator means.

9. In a transfer machine of the type having a plurality of work stations and means for moving work carrying pallets progressively from station to station in the machine, the improvement comprising:
pallet clamps in said work stations at opposite sides thereof, and
means for moving said clamps into and out of engagement with said pallets, including
a common reciprocable actuator for the pallet clamps at one side of said work stations, a common reciprocable actuator for the pallet clamps at the other side of said work stations, a plurality of toggles each connected to a stationary part of said machine and to a respective one of said clamps, said toggles being operable by collapsing movement thereof to move said clamps to a pallet releasing position and operable by extension thereof to move said clamps to a pallet engaging and clamping position, a plurality of resilient bumper means on and movable with said common reciprocable actuators, each of said bumper means being in operative association with a respective one of said toggles and operative by movement of said reciprocable actuators in one direction to extend said toggles so as to clamp said pallets, each of said bumper means being yieldable after clamping engagement of the clamp with which it is associated to permit overtravel of said reciprocable actuators to assure full clamping engagement of all of said clamps, and means carried by and movable with said reciprocable actuators operable by movement of said actuators in the opposite direction to engage said toggles to collapse the same so as to disengage said clamps from said pallets.

10. The combination as set forth in claim 9 including drive means for operating said reciprocable actuators simultaneously and in unison.

11. The combination as set forth in claim 9 including a common drive shaft for said reciprocable actuators, and means coactive with said reciprocable actuators operable by said drive shaft to reciprocally move said actuators simultaneously and in unison in either said one direction or in said opposite direction.

12. In a multi-station transfer machine of the type having work carrying pallets and means for moving said pallets into and out of said stations, means for locating said pallets in said stations comprising a plurality of V-blocks secured to said transfer machine in each of said work stations and V-grooves in said pallets adapted to receive and to seat on said V-blocks, said plurality of V-blocks in each station extending radially with respect to the vertical center line of said station, said pallets being adapted to engage the V-blocks of said stations when the pallets are moved into said stations, and said V-blocks and said V-grooves forming the sole supporting means for said pallets in said stations, said V-blocks and said V-grooves being in such number and so disposed and arranged that each interengaged V-block and V-groove in each station acts in opposition to a plurality of other V-blocks and V-grooves in the same station to locate the pallet on and supported thereby precisely vertically and also horizontally in at least two directions.

13. The combination as set forth in claim 12 wherein the V-blocks in each station are disposed diagonally thereof and wherein the V-grooves are disposed diagonally with respect to and at the corners of said pallet.

14. The combination as set forth in claim 13 further including a plurality of pallet clamping members in each work station engageable with a pallet supported on the V-blocks in said station, said clamping members being disposed and operable to apply downward pressure on said pallet directly over said V-blocks.

15. In a multi-station transfer machine of the type having work carrying pallets, transfer means for moving said pallets from station to station in the machine and for lowering and raising the pallets in said stations, and means for locating said pallets precisely vertically and horizontally in said stations, said locating means comprising a plurality of right angularly related, equispaced, V-grooves in each pallet and in each station, the V-grooves in all of said stations and in all of said pallets being identical in number and identically spaced and arranged, whereby the grooves in each pallet match precisely the grooves in each station, and whereby each groove in each pallet is disposed directly above a corresponding groove in a station when the pallet is lowered into said station by said transfer means, and V-blocks fixedly mounted in said V-grooves of one of said pallets and said stations adapted to accept and to precisely complement the other of said V-grooves.

16. The combination of elements as set forth in claim 15 wherein the V-grooves in all of said stations and in all of said pallets are right angularly related and equispaced from each other and from the centers of said stations and of said pallets, whereby said pallets can be indexed 90° on said V-blocks without changing the orientation of work carried thereby in said station.

17. The combination of elements as set forth in claim 15 wherein the sides of each V-grooves are in 90° angular relation, and wherein said V-blocks are square in cross section.

18. The combination of elements as set forth in claim 15 wherein the V-grooves in each of said stations and in each of said pallets are in sets of four, wherein there are two pairs of grooves in each set disposed precisely at right angles with the grooves in each pair in line with each other, and wherein the grooves of each set are spaced equidistantly from the center of the station or pallet and equidistantly from each other, whereby all sets of said V-grooves can be made identical to each other in a conventional grinder in which the grinding wheel or the work can be indexed exactly 90°.

19. The combination of elements as set forth in claim 15 wherein said V-blocks are mounted in the V-grooves of said stations, wherein each V-block extends above the V-groove in which it is mounted, and wherein the upwardly extending portions of said V-blocks are adapted to enter and to complement the V-grooves of a pallet precisely to locate the latter vertically and horizontally in two directions when the latter is lowered into the station by said transfer means.

20. The combination of elements as set forth in claim 19 including means for blowing air under pressure against the seating surfaces of said V-blocks and the mating surfaces of said V-grooves as said pallets are lowered onto said V-blocks, whereby to assure close fitting mating engagement of said V-blocks and said V-grooves and precise positioning of said pallets in said stations.

* * * * *